(12) United States Patent
Kim (10) Patent No.: US 12,455,786 B2
(45) Date of Patent: Oct. 28, 2025

(54) DATA PROCESSING SYSTEM, STORAGE DEVICE, OPERATING METHOD OF STORAGE DEVICE

(71) Applicant: SK hynix Inc., Gyeonggi-do (KR)

(72) Inventor: Se Joong Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/665,596

(22) Filed: May 16, 2024

(65) Prior Publication Data
US 2025/0238323 A1    Jul. 24, 2025

(30) Foreign Application Priority Data
Jan. 22, 2024    (KR) .................. 10-2024-0009513

(51) Int. Cl.
G06F 11/10    (2006.01)
G06F 3/06    (2006.01)

(52) U.S. Cl.
CPC ........ *G06F 11/1096* (2013.01); *G06F 3/0689* (2013.01); *G06F 11/1076* (2013.01); *G06F 11/108* (2013.01); *G06F 2211/1004* (2013.01); *G06F 2211/1021* (2013.01); *G06F 2211/1023* (2013.01); *G06F 2212/262* (2013.01)

(58) Field of Classification Search
CPC ............ G06F 11/1096; G06F 11/1076; G06F 11/108; G06F 3/0689; G06F 2211/1004; G06F 2211/1021; G06F 2211/1023; G06F 2212/262
USPC .............. 714/758, 769, 770, 773, 799, 800; 365/185.09; 711/114
See application file for complete search history.

(56) References Cited

U.S. PATENT DOCUMENTS

| | | | | |
|---|---|---|---|---|
| 7,827,351 B2* | 11/2010 | Suetsugu | ............ | G06F 11/1096 711/170 |
| 10,102,070 B2* | 10/2018 | Nomura | .............. | G06F 11/1076 |
| 10,725,865 B2* | 7/2020 | Okada | .................... | G06F 3/0619 |
| 10,929,037 B2* | 2/2021 | Gupta | ................. | G06F 11/1076 |
| 11,095,316 B2* | 8/2021 | Ha | ....................... | G06F 11/1012 |

(Continued)

FOREIGN PATENT DOCUMENTS

KR    10-1504632 B1    3/2015

OTHER PUBLICATIONS

Yi et al., Dual RAID: A Scheme for High Reliable All Flash Array, 2014, IEEE, pp. 218-222. (Year: 2014).*

(Continued)

*Primary Examiner* — John J Tabone, Jr.
(74) *Attorney, Agent, or Firm* — IP & T GROUP LLP (57) ABSTRACT

A storage device may include a storage medium configured to store data of an external device; and a storage controller configured to control an operation of the storage medium. The storage controller is configured to receive a storage request for the data and an external trust level of the data from the external device, determine an internal trust level of the data as one of a plurality of internal trust levels based on the external trust level in consideration of a status of the storage medium, group the data into unit data having an arbitrary size corresponding to the determined internal trust level, generate parity information corresponding to the determined internal trust level based on the grouped data, and control an operation of storing the grouped data and the parity information in the storage medium.

19 Claims, 8 Drawing Sheets

(56) References Cited

U.S. PATENT DOCUMENTS

| | | | |
|---|---|---|---|
| 2005/0050381 A1* | 3/2005 | Maddock | G06F 11/2087 |
| | | | 714/E11.034 |
| 2008/0115017 A1* | 5/2008 | Jacobson | G06F 11/1076 |
| | | | 714/710 |
| 2011/0202923 A1* | 8/2011 | Matsubayashi | G06F 8/65 |
| | | | 718/100 |
| 2013/0094337 A1* | 4/2013 | Yajima | G11B 7/00458 |
| 2017/0083417 A1* | 3/2017 | Kawaguchi | G06F 11/2092 |
| 2017/0322845 A1* | 11/2017 | Nomura | G06F 3/0689 |
| 2018/0018231 A1* | 1/2018 | Okada | G06F 11/1076 |
| 2018/0032265 A1* | 2/2018 | Kotzur | G06F 11/108 |
| 2019/0012236 A1* | 1/2019 | Hitron | G06F 11/1092 |
| 2020/0259511 A1* | 8/2020 | Ha | G06F 11/1076 |
| 2021/0124641 A1* | 4/2021 | Caldwell, Jr. | G06F 3/0665 |
| 2023/0385167 A1* | 11/2023 | Hua | G06F 11/108 |
| 2023/0418518 A1* | 12/2023 | Hahn | G06F 3/061 |

OTHER PUBLICATIONS

Koo et al., Dual RAID technique for ensuring high reliability and performance in SSD, Jun. 1, 2015, IEEE, pp. 1-6. (Year: 2015).*

* cited by examiner

| LBA | SIZE | GROUPING LEVEL | PARITY SIZE |
|---|---|---|---|
| 0X1000 | 100 | PLANE | a |
| 0X3000 | 1000 | DIE | b |
| 0X8000 | 50 | SUPER BLOCK | c |
| 0X8100 | 30 | X-PAGE | d |
| ⋮ | ⋮ | ⋮ | ⋮ |

DATA PROCESSING SYSTEM, STORAGE DEVICE, OPERATING METHOD OF STORAGE DEVICE

CROSS-REFERENCES TO RELATED APPLICATION

The present application claims priority under 35 U.S.C. § 119 (a) to Korean application number 10-2024-0009513, filed on Jan. 22, 2024, which is incorporated herein by reference in its entirety.

BACKGROUND

1. Technical Field

Embodiments of the present disclosure relate to a semiconductor integrated device, and more particularly, to a data processing system, a storage device, and an operating method of the storage device.

2. Related Art

A storage device may be configured to write data in a storage medium and read the data from the storage medium according to a request from an external device.

The storage device may use a redundant array of independent/inexpensive disks, such as a (RAID) technique, in order to ensure the reliability of data stored in the storage medium. By using the RAID technique, an uncorrectable error may be recovered by an error correction circuit.

Since some RAID techniques involve the generation of parity information (RAID parity), a part of the storage medium needs to be allocated to store a RAID parity.

SUMMARY

Various embodiments of the present disclosure are directed to providing a data processing system capable of dynamically determining RAID reliability according to the importance of data to be stored, a storage device, and an operating method of the storage device.

A storage device in accordance with an embodiment of the present disclosure may include a storage medium configured to store data of an external device; and a storage controller configured to control an operation of the storage medium. The storage controller is configured to receive a storage request for the data and an external trust level of the data from the external device, determine an internal trust level of the data as one of a plurality of internal trust levels based on the external trust level in consideration of a status of the storage medium, group the data into unit data having an arbitrary size corresponding to the determined internal trust level, generate parity information corresponding to the determined internal trust level based on the grouped data, and control an operation of storing the grouped data and the parity information in the storage medium.

A data processing system in accordance with an embodiment of the present disclosure may include a data processing device; and a storage controller including a storage medium, which interfaces communication between the data processing device and the storage medium. The storage controller is configured to receive a storage request for processed data and an external trust level of the processed data from the data processing device, determine an internal trust level of the processed data as one of a plurality of internal trust levels based on the external trust level in consideration of a status of the storage medium, group the processed data into unit data having an arbitrary size corresponding to the determined internal trust level, generate parity information corresponding to the determined internal trust level based on the grouped processed data, and control an operation of storing the grouped processed data and the parity information in the storage medium.

A storage device in accordance with an embodiment of the present disclosure may include a storage medium including a plurality of memory blocks including a plurality of pages, an arbitrary number of planes including a plurality of memory blocks, and an arbitrary number of dies including an arbitrary number of planes; and a storage controller configured to control write and read operations on the storage medium. The storage controller comprises: a trust level setting circuit configured to transmit status information of the storage medium to the external device in response to a write request from an external device and to request the external device to determine an external trust level for write data; a trust level adjustment circuit configured to determine an internal trust level according to whether the external trust level provided from the external device is acceptable; and a processor configured to generate parity information by grouping a memory area where the write data is to be written at a grouping level corresponding to the internal trust level.

An operating method of a storage device in accordance with an embodiment of the present disclosure is an operating method of a storage device that controls an operation of a storage medium for storing data of an external device, and may include receiving a storage request for the data and an external trust level of the data from the external device; determining an internal trust level of the data as one of a plurality of internal trust levels based on the external trust level in consideration of a status of the storage medium; grouping the data into unit data having an arbitrary size corresponding to the determined internal trust level; generating parity information corresponding to the determined internal trust level based on the grouped data; and controlling an operation of storing the grouped data and the parity information in the storage medium.

In accordance with the embodiments of the present disclosure, the reliability of dynamic RAID may be reduced for data requested to be stored, so that a RAID parity storage space may be efficiently used.

DETAILED DESCRIPTION

Hereinafter, embodiments of the present disclosure will be described in more detail with reference to the accompanying drawings.

Figure 1:
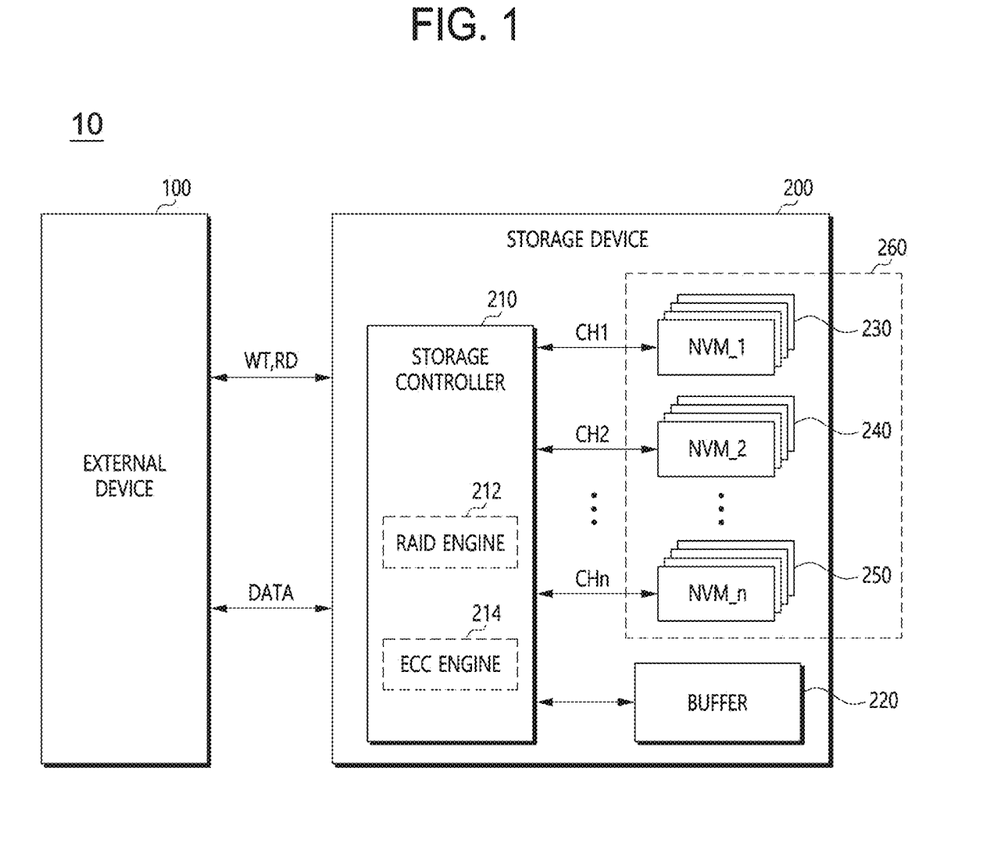
FIG. 1 is a diagram illustrating a configuration of a data processing system in accordance with an embodiment of the present disclosure.

FIG. 1 is a diagram illustrating a configuration of a data processing system 10 in accordance with an embodiment of the present disclosure.

Referring to FIG. 1, the data processing system 10 may include an external device 100 and a storage device 200.

The external device 100 may include at least one processor. The external device 100 may be a processor itself or an electronic device or a system including a processor.

The storage device 200 may include a storage controller 210, a buffer memory device 220, and a storage medium 260. The storage medium 260 may include at least a plurality of nonvolatile memory devices (NVM_1 to NVM_n) 230, 240, and 250.

The external device 100 may transmit a write request WT including a write command, an address, and write data to the storage device 200 in order to store data. Accordingly, the storage device 200 may control the storage medium 260 to program the write data.

In order to read data, the external device 100 may transmit a read request RD including a read command and an address to the storage device 200. The storage device 200 may read read-requested data from the storage medium 260 and transmit the read data DATA to the external device 100. The storage device 200 may read data from the storage medium 260 in order to perform an internal operation as well as the read request RD from the external device 100. The internal operation may include a housekeeping operation such as garbage collection and wear leveling.

The buffer memory device 220 may temporarily store data transmitted and received between the external device 100 and the storage device 200 during a write or read operation.

The storage controller 210 may provide interfacing between the external device 100 and the storage device 200. The storage controller 210 a may include redundant array of independent/inexpensive disks (RAID) engine 212 and an error correction code (ECC) engine 214.

The RAID engine 212 may store write-requested data in the storage medium 260 in a manner according to a set RAID level (i.e., trust level, confidence level, or integrity level).

The ECC engine 214 may perform encoding for error correction and detection on the write-requested data, and detect and correct an error included in read-requested data.

When an uncorrectable error occurs in read data, the data having the uncorrectable error may be recovered by the RAID engine 212.

Figure 2:
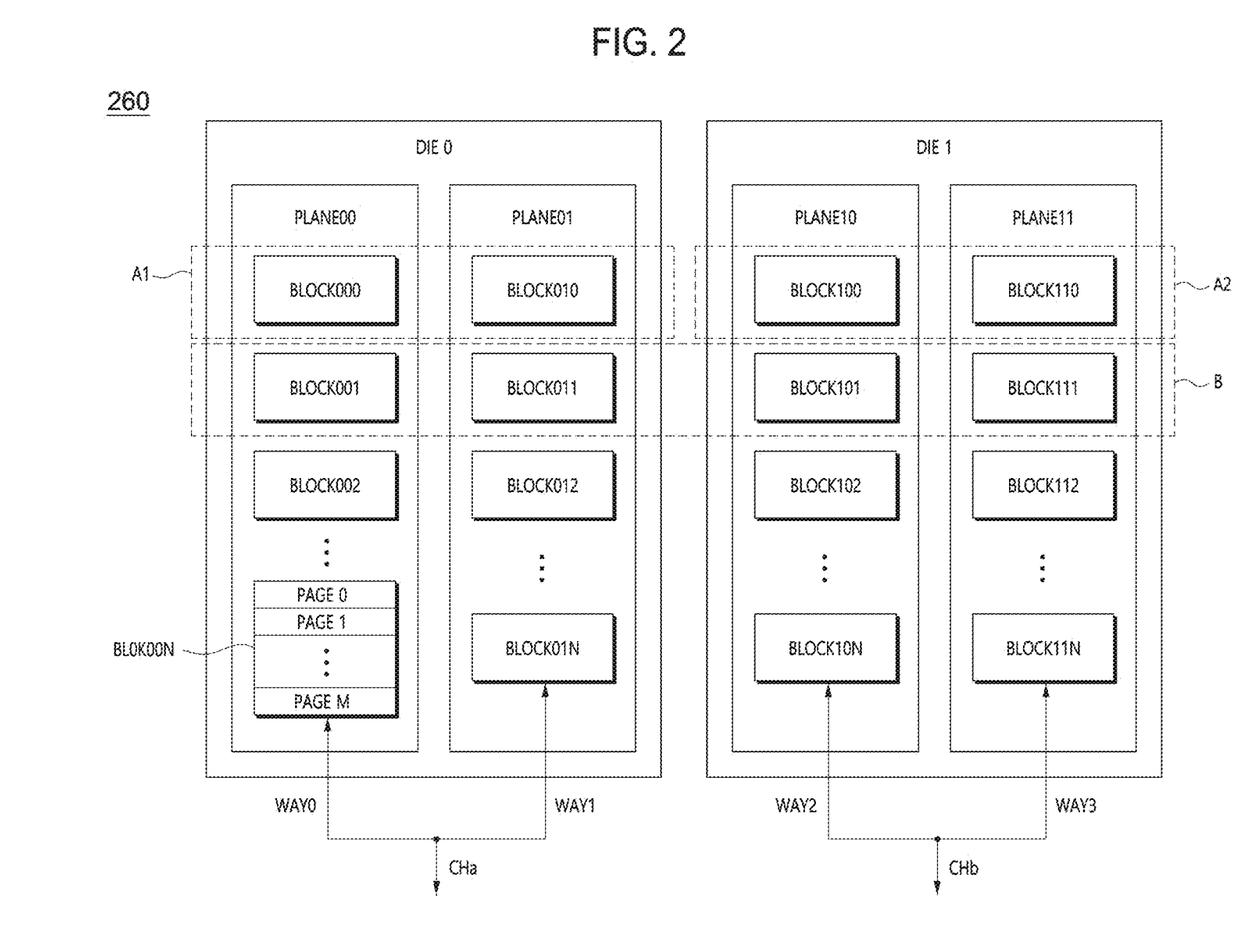
FIG. 2 is a diagram for describing a management concept of a storage medium including a nonvolatile memory device in accordance with an embodiment of the present disclosure.

FIG. 2 is a diagram for describing a management concept of a storage medium including a nonvolatile memory device NVM 260 in accordance with an embodiment of the present disclosure.

The nonvolatile memory device NVM 260 may include an arbitrary number of dies DIE0 and DIE1, and the dies DIE0 and the DIE1 may include an arbitrary number of planes PLANE00 and PLANE01 and an arbitrary number of planes PLANE10 and PLANE11, respectively. The plane PLANE00 may include a plurality of memory blocks BLOCK000 to BLOCK00N, the plane PLANE01 may include a plurality of memory blocks BLOCK010 to BLOCK01N, the plane PLANE10 may include a plurality of memory blocks BLOCK100 to BLOCK10N, and the plane PLANE11 may include a plurality of memory blocks BLOCK110 to BLOCK11N. The memory blocks BLOCK000 to BLOCK00N, BLOCK010 to BLOCK01N, BLOCK100 to BLOCK10N, and BLOCK110 to BLOCK11N may each include a plurality of pages PAGE 0 to PAGE M.

The nonvolatile memory device NVM 260 may input/output data through channels Cha and CHb. Each of the channels Cha and CHb may input/output data by using an interleaving method. The channels Cha may be branched into a plurality of paths WAY0 and WAY1 that share the channel Cha and are connected to the planes PLANE00 and PLANE01, for example, and the channels Chb may be branched into a plurality of paths WAY2 and WAY3 that share the channel Chb and are connected to the planes PLANE10 and PLANE11, for example.

FIG. 2 illustrates an example in which the dies DIE0 and DIE1 are connected to the independent channels Cha and CHb, respectively, the planes PLANE00 and PLANE01 are connected to the paths WAY0 and WAY1 branched from the channel Cha, and the planes PLANE10 and PLANE11 are connected to the paths WAY2 and WAY3 branched from the channel Chb; however, the configuration of the nonvolatile memory device NVM 260 is not limited thereto.

The storage controller 210 may configure a superblock by grouping simultaneously accessible blocks among the plurality of memory blocks.

The super block may be configured as a combination of simultaneously accessible blocks by grouping (A1 and A2) memory blocks included in different planes within substantially the same die, or by grouping (B) memory blocks included in different planes within a plurality of dies.

Figure 3:
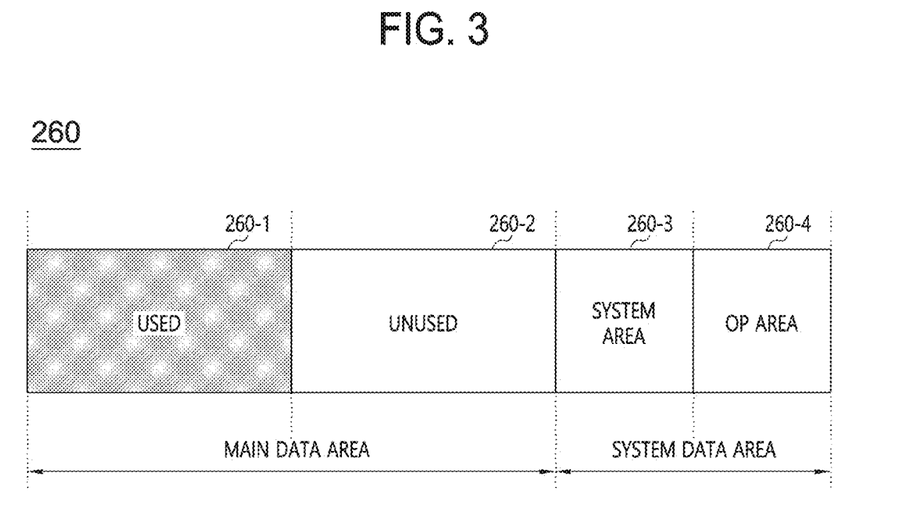
FIG. 3 is a diagram illustrating a logical configuration of a storage medium including a nonvolatile memory device in accordance with an embodiment of the present disclosure.

FIG. 3 is a diagram illustrating a logical configuration of the storage medium 260 including a nonvolatile memory device in accordance with an embodiment of the present disclosure.

Referring to FIG. 3, the storage medium 260 may include a main data area and a system data area depending on the type of data to be stored.

Data requested to be written by the external device 100 may be stored in the main data area. The main data area may include a used space (USED) 260-1 being a space where data has already been stored, and a remaining space (UNUSED) 206-2 being an empty space where no data is stored.

The system data area may include a system area (SYSTEM AREA) 206-3 where system information is stored and an over-provisioning area (OP AREA) 206-4 required to substantially maintain the operating performance of the storage device 200.

The system information stored in the system area 206-3 may include map data regarding mapping information between logical addresses and physical addresses, information used for a booting operation of the storage device 200, setting information used to drive and execute firmware of the storage controller 210, and the like.

The over-provisioning area 206-4 may be a reserve area allocated so that various functions used for operating the storage device 200, such as wear leveling, garbage collection, and bad block management, may be smoothly performed. Accordingly, the size of the over-provisioning area 206-4 may affect maintaining performance and extending the lifespan of the storage device 200.

RAID is a technology for maintaining the integrity of data stored in the storage medium 260 and identifying and correcting an error. Various levels of RAID methods are known, and parity information generated when data is stored by the RAID method may be stored in the over-provisioning area 206-4.

Figure 4:
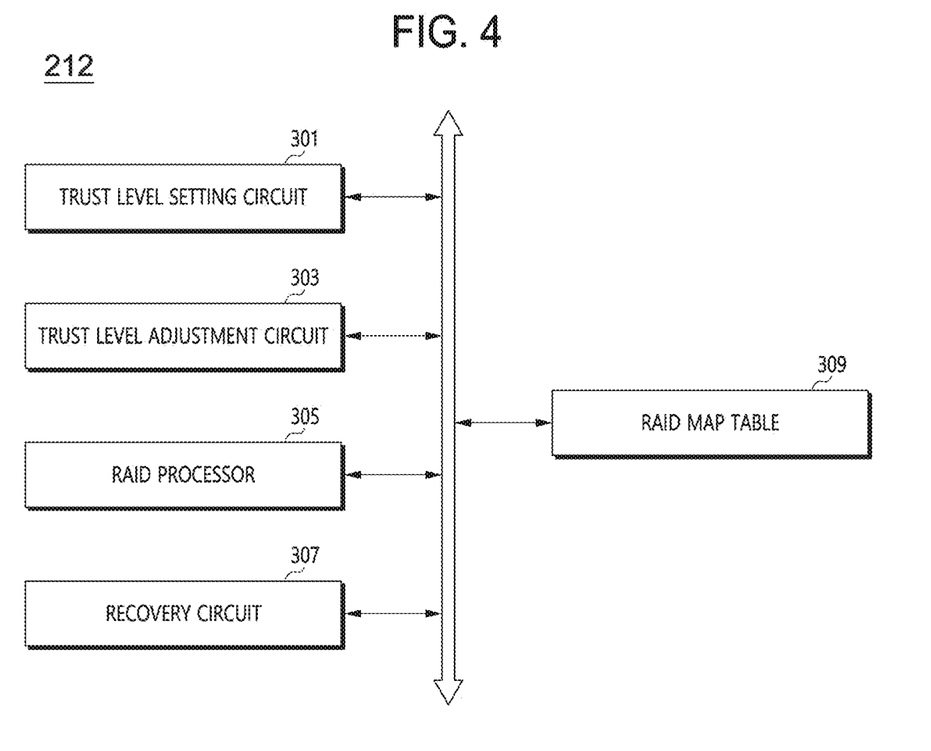
FIG. 4 is a diagram illustrating a configuration of a RAID engine in accordance with an embodiment of the present disclosure.

FIG. 4 is a diagram illustrating a configuration of the RAID engine 212 in accordance with an embodiment of the present disclosure.

Referring to FIG. 4, the RAID engine 212 in accordance with an embodiment may include a trust level setting circuit 301, a trust level adjustment circuit 303, a RAID processor 305, a recovery circuit 307, and a RAID map table 309.

In response to a write request from the external device 100, the trust level setting circuit 301 may provide the external device 100 with RAID information on a plurality of internal trust levels, which are example values of the trust level, together with device information of the storage medium 260. The RAID information may include size information of the parity information corresponding to the plurality of internal trust levels. Accordingly, the external device 100 may determine one of the example values of the trust level based on the device information according to the importance of data to be written, and transmit the determined trust level to the storage device 200 as an external trust level.

In an embodiment, the device information may include status information of the storage medium 260. The status information of the storage medium 260 may include an allowable program/erase number (i.e., PE cycle), an allowable cumulative error number (i.e., grown bad block number), and the capacity of the storage medium 260 (i.e., total number of memory blocks) defined in the specification of the storage medium 260. The device information may further include real-time status information reflecting the usage status of the storage medium 260, for example, a current PE number, a current cumulative error number, and a remaining memory capacity (i.e., number of remaining memory blocks).

When data is programmed in the RAID method, the plurality of internal trust levels may be generated based on a grouping level serving as a unit of memory area grouped in order to generate parity information and having an arbitrary size.

The grouping level of the memory area may be a die, a plane, a superblock, a page, or the like, and the lower the grouping level, the larger the parity information is, and the reliability of stored data may be strengthened.

The trust level setting circuit 301 may provide RAID information including the plurality of internal trust levels according to the grouping level and the size information of the parity information corresponding to the plurality of internal trust levels to the external device 100 as a trust level value, and request the external device 100 to determine an external trust level according to the importance of write data.

When the determined external trust level is transmitted from the external device 100, the trust level setting circuit 301 may update the RAID map table 309.

Figure 5:
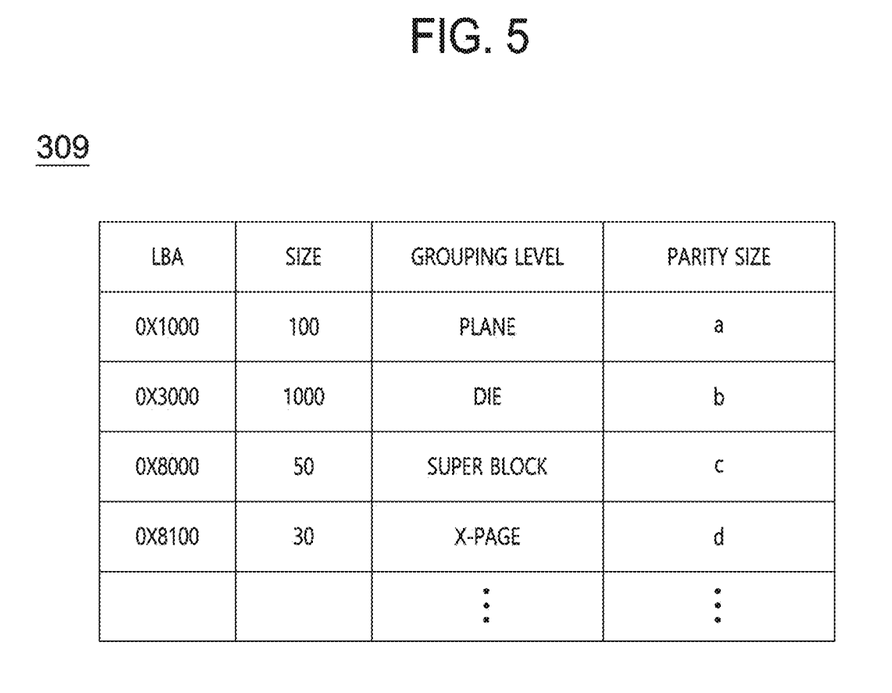
FIG. 5 is a RAID map table in accordance with an embodiment of the present disclosure.

FIG. 5 shows a configuration of the RAID map table 309 in accordance with an embodiment of the present disclosure.

Referring to FIG. 5, the RAID map table 309 may include a logical address (LBA) of write-requested data, a size (SIZE) of the write-requested data, a grouping level (GROUPING LEVEL) corresponding to a determined internal level, and a size (PARITY SIZE) of parity information corresponding to the determined internal trust level.

In an embodiment, the grouping level may be a unit for generating parity information, such as plane, die, super block, and an arbitrary number of pages (X-Pages), when write data is programmed in a memory area.

Depending on the RAID method used by the storage device 200, the size (PARITY SIZE) of parity information may be determined for each grouping level and stored in the RAID map table 309.

Referring back to FIG. 4, the trust level adjustment circuit 303 may be configured to determine the size of parity information to be generated according to the external trust level determined by the external device 100, and to determine whether to accept an external trust level according to the size of the system data area allocated to the storage device 200.

Referring back to FIG. 3, the trust level adjustment circuit 303 may determine whether to accept the external trust level based on the remaining size of the over-provisioning area 206-4 for storing parity information in the system data area.

For example, when the proportion of parity information to be generated is smaller than a set first threshold, the trust level adjustment circuit 303 may accept the external trust level. The proportion of the parity information to be generated may be a ratio of the size of the parity information to be generated according to the trust level determined by the external device 100 to the remaining size of the over-provisioning area 206-4.

In an embodiment, when the proportion of the parity information to be generated is smaller than a set second threshold, which is less than first threshold, the trust level adjustment circuit 303 may not accept the external trust level and may determine the internal trust level by adjusting the trust level upward. In such a case, the proportion of the parity information to be generated according to the increased internal trust level may be adjusted to be smaller than the first threshold.

When the proportion of the parity information to be generated is equal to or greater than the set first threshold, the trust level adjustment circuit 303 may notify the external device 100 that the external trust level is unacceptable.

When the proportion of the parity information to be generated is equal to or greater than the set first threshold, the trust level adjustment circuit 303 may adjust the internal trust level so that the proportion of the parity information to be generated is smaller than the first threshold. The trust level adjustment result may be reflected in the RAID map table and notified to the external device 100.

In an embodiment, when the external trust level is unacceptable, the trust level adjustment circuit 303 may notify the external device 100 that the external trust level is unacceptable, and request the re-determination of the external trust level. Accordingly, when the external device 100 changes the external trust level, the trust level adjustment circuit 303 may determine whether to accept the changed external trust level and perform a series of operations according to the determination result.

In an embodiment, when the external device 100 does not change the external trust level, the trust level adjustment circuit 303 may substantially maintain the external trust level initially determined by the external device 100, and notify the external device 100 of the risk due to a corresponding program operation, for example, the prediction of shortage of the OP AREA 206-4.

In an embodiment, when the external device 100 does not change the external trust level, the trust level adjustment circuit 303 may notify the external device 100 that program processing has failed.

In an embodiment, when the external trust level is unacceptable, the trust level adjustment circuit 303 may maintain the external trust level, and notify the external device 100 of the risk due to a corresponding program operation, for example, the prediction of shortage of the OP AREA 206-4.

In an embodiment, when the external trust level is unacceptable, the trust level adjustment circuit 303 may notify the external device 100 that program processing has failed while notifying that the external trust level is unacceptable.

The RAID processor 305 may generate parity information on write data at a grouping level corresponding to the internal trust level determined by the trust level adjustment circuit 303, and store the write data in the storage medium 260 in the RAID method.

When an uncorrectable error occurs in data read according to a read request from the external device 100, the recovery circuit 307 may recover read data based on the parity information. The recovery circuit 307 may recover the data by applying the parity information according to the grouping level stored in the RAID map table 309.

FIGS. 6 to 9 are flowcharts for describing an operating method of the storage device in accordance with an embodiment of the present disclosure.

Figure 6:
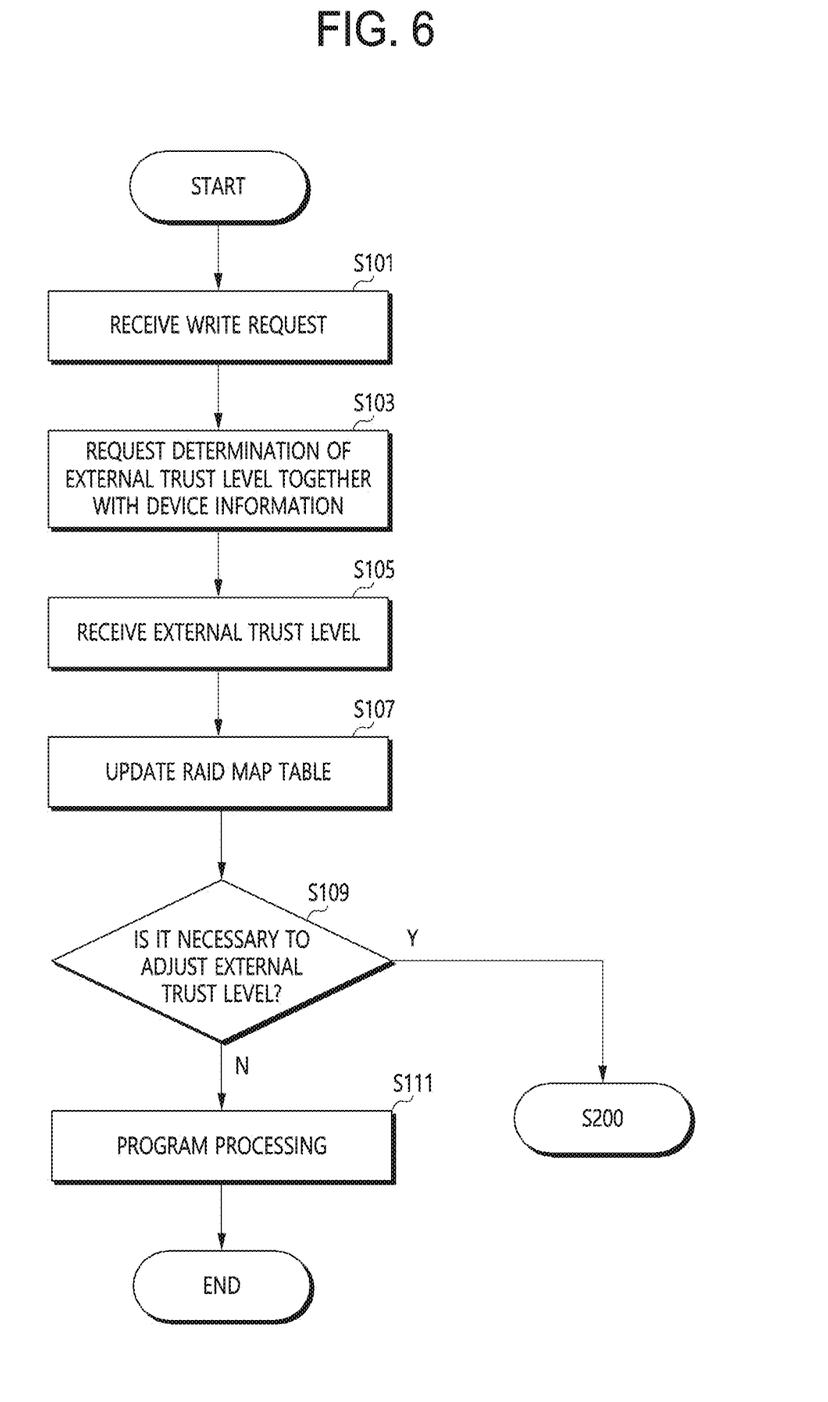
FIGS. 6 to 9 are flowcharts for describing an operating method of a storage device in accordance with an embodiment of the present disclosure.

Referring to FIG. 6, as a write request is received from the external device 100 (operation S101), the storage device 200 may request the external device 100 to determine the external trust level together with the device information of the storage medium 260 (operation S103). Accordingly, the external device 100 may determine the external trust level based on the importance of write data and the device information and transmit the determined external trust level to the storage device 200.

When requesting the determination of the external trust level, the storage device 200 may transmit RAID information together with the device information. The RAID information may include a plurality of internal trust levels and the size of parity information corresponding thereto.

In an embodiment, the device information may include the status information of the storage medium 260, and may further include real-time status information reflecting the usage status of the storage medium 260. In an embodiment, the external device 100 may select any one of the plurality of internal trust levels as the external trust level based on the RAID information. When the storage device 200 programs data in the RAID method, the plurality of internal trust levels may be generated according to a grouping level that is a unit of a memory area grouped to generate the parity information.

The grouping level of the memory area may be a die, a plane, a superblock, a page, or the like.

When the determined external trust level is transmitted from the external device 100 (operation S105), the storage device 200 may update the RAID map table 309 (operation S107).

The storage device 200 may determine whether to adjust the external trust level according to the size of parity information to be generated according to the external rust level and the size of the SYSTEM DATA AREA allocated to the storage medium 200 (operation S109).

In an embodiment, whether the external trust level needs to be adjusted may be determined by comparing the proportion of the parity information to be generated according to the external trust level with the first threshold.

The proportion of the parity information to be generated be a ratio of the size of the parity information that is generated according to the external trust level to the remaining size of the over-provisioning area 206-4.

In an embodiment, when the proportion of the parity information to be generated is smaller than the first threshold and thus the trust level is acceptable (i.e., 'N' in the operation S109), the storage device 200 may generate a parity for write data according to the grouping level corresponding to the external trust level and store the write data in the storage medium 260 in the RAID method (operation S111).

Figure 7:
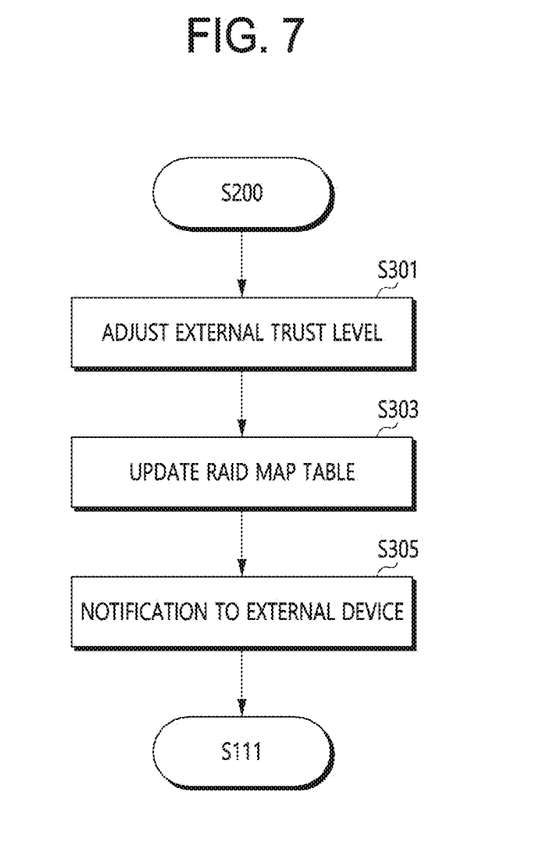
Figure 8:
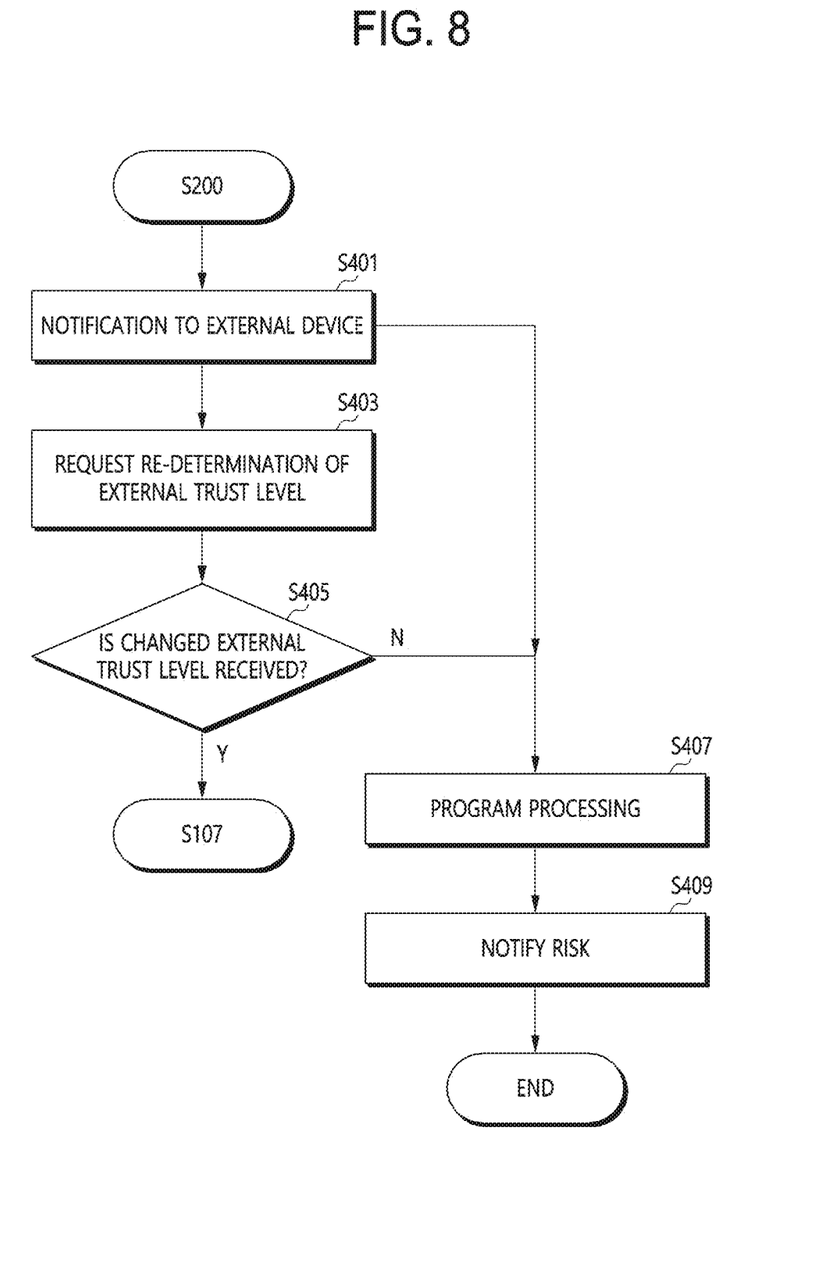
Figure 9:
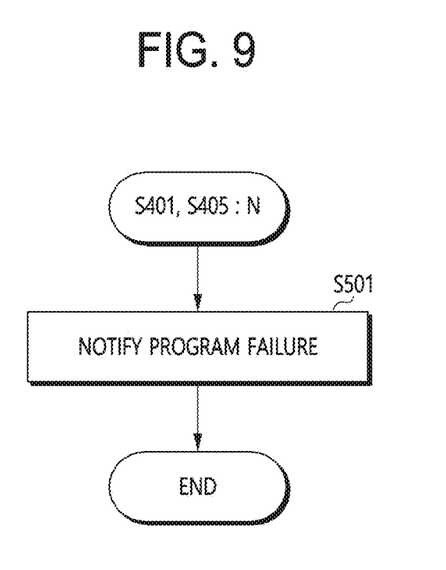

In an embodiment, when the external trust level needs to be adjusted (i.e., 'Y' in operation S109), the storage device 200 may perform processes illustrated in FIGS. 7 to 9.

Referring to FIG. 7, when the proportion of the parity information to be generated is smaller than the set second threshold or is equal to or greater than the set first threshold, the storage device 200 may adjust the external trust level to determine the internal trust level (operation S301).

For example, when the proportion of the parity information to be generated is smaller than the set second threshold, the RAID ENGINE 212 may determine the internal trust level by adjusting the external trust level upward. In such a case, the proportion of the parity information to be generated according to the internal trust level determined by upward adjustment may be adjusted to be smaller than the first threshold.

When the proportion of the parity information to be generated is equal to or greater than the set first threshold, the RAID ENGINE 212 may adjust the external trust level so that the proportion of the parity information to be generated is smaller than the first threshold.

The trust level adjustment result may be reflected in the RAID map table (operation S303) and notified to the external device 100 (operation S305).

Subsequently, the storage device 200 may perform the operation S111 illustrated in FIG. 6.

Referring to FIG. 8, when the proportion of the parity information to be generated according to the external trust level is equal to or greater than the first threshold and thus the external trust level needs to be adjusted (i.e., 'Y' in the operation S109), the storage device 200 may notify the external device 100 that the external trust level needs to be adjusted (operation S401) and request the re-determination of the external trust level (operation S403). Accordingly, the storage device 200 may check whether the external device 100 changes the external trust level (operation S405), and when the external trust level is changed (i.e., 'Y' in operation S405), the storage device 200 may proceed to the operation S107 of determining whether the external trust level is acceptable and perform the subsequent operations.

In an embodiment, when the external trust level is unacceptable and this fact is notified to the external device 100 (S401) or when the external device 100 does not change the external trust level (i.e., 'N' in the operation S405), the storage device 200 may perform a program operation according to the external trust level initially determined by the external device 100 (operation S407), and notify the external device 100 of the risk due to the program operation, for example, the prediction of shortage of the OP AREA 206-4 (operation S409).

In another embodiment, when the external trust level determined by the external device 100 needs to be adjusted (i.e., 'Y' in the operation S109), the storage device 200 may notify the external device 100 that the external trust level needs to be adjusted (the operation S401), and perform the program operation according to the external trust level initially determined by the external device 100 (the operation S407). Subsequently, the storage device 200 may notify the external device 100 of the risk due to the program operation, for example, the prediction of shortage of the OP AREA 206-4 (the operation S409).

Referring to FIG. 9, when the external trust level is unacceptable and this fact is notified to the external device 100 (operation S401) or when the external device 100 does not change the external trust level (i.e., 'N' in the operation S405), the storage device 200 may notify the external device 100 that program processing has failed (operation S501).

The storage device 200 may generate a parity for write data at a grouping level corresponding to the internal trust level determined in this way, and store the write data in the storage medium 260 in the RAID method.

Subsequently, when an uncorrectable error occurs in data read according to a read request from the external device 100, the storage device 200 may acquire the grouping level of the read data by referring to the RAID map table 309. Subsequently, the storage device 200 may recover the data including the uncorrectable error by applying parity information according to the acquired grouping level.

A person skilled in the art to which the present disclosure pertains can understand that the embodiments of the present disclosure may be carried out in other specific forms without changing its technical spirit or essential features. Therefore, it should be understood that the embodiments described above are illustrative in all aspects, not limitative. The scope of the present disclosure is defined by the claims to be described below rather than the detailed description, and it should be construed that all changes or modified forms derived from the meaning and scope of the claims and the equivalent concept thereof are included in the scope of the present disclosure. Furthermore, the embodiments may be combined to form additional embodiments.

What is claimed is:

1. A storage device comprising:
   a storage medium configured to store data of an external device; and
   a storage controller configured to control an operation of the storage medium,
   wherein the storage controller is configured to
   receive a storage request for the data and an external trust level of the data from the external device,
   determine an internal trust level of the data as one of a plurality of internal trust levels based on the external trust level in consideration of a status of the storage medium,
   group the data into unit data having a size corresponding to the determined internal trust level,
   generate parity information corresponding to the determined internal trust level based on the grouped data, and
   control an operation of storing the grouped data and the parity information in the storage medium.

2. The storage device according to claim 1, wherein the storage controller is configured to request the external trust level from the external device.

3. The storage device according to claim 1, wherein the storage controller is configured to generate parity information with different sizes for each of the plurality of internal trust levels.

4. The storage device according to claim 1, wherein each of the external trust level and the internal trust level comprises a redundant array of independent/inexpensive disks (RAID) level, and
   the storage controller is configured to generate RAID information including size information of the parity information corresponding to the plurality of internal trust levels.

5. The storage device according to claim 4, wherein the storage controller is configured to transmit the RAID information to the external device.

6. The storage device according to claim 1, wherein the storage controller is configured to determine the plurality of internal trust levels according to a size of the grouped unit data when the storage-requested data is programmed in the storage medium.

7. The storage device according to claim 1, wherein the storage controller is configured to transmit, to the external device, status information including an allowable program/erase number, an allowable cumulative error number, and a capacity of the storage medium.

8. The storage device according to claim 7, wherein the storage controller is configured to transmit real-time status information including a current program/erase number, a current cumulative error number, and a remaining capacity of the storage medium to the external device as the status information.

9. The storage device according to claim 1,
   wherein the storage medium includes a system data area where the parity information is stored, and
   wherein the storage controller is configured to determine the internal trust level by determining whether to accept the external trust level based on a ratio of a size of the parity information to a remaining size of the system data area.

10. The storage device according to claim 9, wherein the storage controller is configured to request the external device to adjust the external trust level when the external trust level is unacceptable.

11. The storage device according to claim 9, wherein the storage controller is configured to notify the external device of a risk according to the remaining size of the system data area when the external trust level is unacceptable.

12. The storage device according to claim 9, wherein the storage controller is configured to notify the external device that the storage operation has failed when the external trust level is unacceptable.

13. A storage device comprising:
    a storage medium including a plurality of memory blocks including a plurality of pages, a plurality of planes including a plurality of memory blocks, and a plurality of dies including a plurality of planes; and
    a storage controller configured to control write and read operations on the storage medium,
    wherein the storage controller comprises:
    a trust level setting circuit configured to transmit status information of the storage medium to the external device in response to a write request from an external device and to request the external device to determine an external trust level for write data;
    a trust level adjustment circuit configured to determine an internal trust level according to whether the external trust level provided from the external device is acceptable; and
    a processor configured to generate parity information by grouping a memory area where the write data is to be written at a grouping level corresponding to the internal trust level.

14. The storage device according to claim 13, wherein, when the write data is programmed in the storage medium in a RAID method, the trust level setting circuit sets a plurality of internal trust levels based on a grouping level serving as a unit of the memory area grouped to generate the parity information, and
    the trust level adjustment circuit is configured to determine the internal trust level as one of the plurality of internal trust levels according to whether the external trust level provided from the external device is acceptable.

15. The storage device according to claim 13, wherein the trust level setting circuit is configured to group the memory areas in units of the dies, the planes, the memory blocks, or the pages.

16. The storage device according to claim 13, wherein the storage medium includes a system data area where the parity information is stored, and the trust level adjustment circuit is configured to determine whether to accept the external trust level provided by the external device, based on a ratio of a size of the parity information to a remaining size of the system data area.

17. The storage device according to claim 13, wherein the trust level adjustment circuit is configured to adjust the internal trust level by itself when the external trust level provided by the external device is unacceptable.

18. The storage device according to claim 13, wherein the storage controller is configured to further include a RAID map table that manages an address associated with the write request, a size of the write data, the grouping level, and a size of the parity information.

19. The storage device according to claim 13, wherein the status information includes an allowable program/erase number, an allowable cumulative error number, and a capacity of the storage medium.

\* \* \* \* \*